United States Patent [19]

Oles et al.

[11] Patent Number: 5,508,764
[45] Date of Patent: Apr. 16, 1996

[54] APPARATUS AND METHOD FOR DISPLAYING FLOOR, CEILING AND WALL COVERINGS

[76] Inventors: Henry Oles, P.O. Box 78, San Marcos, Tex. 78667; Ray Youngker, 2472 Hitching Post, Allison Park, Pa. 15101

[21] Appl. No.: 457,228

[22] Filed: Jun. 1, 1995

Related U.S. Application Data

[63] Continuation-in-part of Ser. No. 298,059, Aug. 30, 1994, Pat. No. 5,483,308.
[51] Int. Cl.⁶ .................................................. G03B 21/28
[52] U.S. Cl. ............................. 353/98; 353/28; 359/630
[58] Field of Search ........................... 353/28, 98, 99, 353/122; 359/630, 629, 635, 459, 443; 345/8, 9, 10

[56] References Cited

U.S. PATENT DOCUMENTS

| 3,620,592 | 11/1971 | Freeman | 359/631 |
| 5,112,121 | 5/1992 | Chang et al. | 353/94 |
| 5,189,452 | 2/1993 | Hodson et al. | 353/99 |
| 5,418,584 | 5/1995 | Larson | 353/38 |

Primary Examiner—William A. Cuchlinski, Jr.
Assistant Examiner—William C. Dowling
Attorney, Agent, or Firm—Matthew J. Booth

[57] ABSTRACT

This invention discloses a projection apparatus and method for displaying floor, ceiling, and wall coverings. A projector contained within a special projection tower and combined with retroreflective screens provide a means for manufacturers to display coverings in a full size perspective even in normal ambient light.

12 Claims, 2 Drawing Sheets

APPARATUS AND METHOD FOR DISPLAYING FLOOR, CEILING AND WALL COVERINGS

This application is a Continuation in Part of U.S. application Ser. No. 08/298,059, filed on Aug. 30, 1994, now U.S. Pat. No. 5,483,308.

U.S. application Ser. No. 08/298,059, now U.S. Pat. No. 5,483,308 is incorporated herein by reference for all purposes.

BACKGROUND OF THE INVENTION

1. Field of the Invention

This invention relates to a projection device using retroreflective screens that enable the simultaneous viewing of both the horizontal and vertical elements of a scene in a room without reducing ambient illumination.

2. Description of the Related Art

Traditionally, customers for various wall coverings, ceiling tiles or coverings, and floor tiles or coverings have always had difficulty in choosing a particular color or pattern. Manufacturers typically provide small actual samples of their products in the various color schemes. At the least, manufacturers will show photographs depicting the product in various scenes and various styles. In the worst case, manufacturers just simply provide a color chart showing the potential designs. In each case, however, a typical customer complaint is that the customer is not able to perceive visually the final look of the product in a real full size setting or environment before the final purchase. More often than not, the customer becomes unhappy after the fact upon final installation of the wall, ceiling, or floor covering because the customer can finally perceive for the first time the final product.

The preferred embodiment of this invention solves this problem by providing the manufacturer with a means of projecting photographic slides on to a retroreflective screen mounted onto the room's ceiling with an optional drop-down retroreflective screen. This embodiment excels in stores with limited floor space but with plenty of ceiling space such as currently found in warehouse type home improvement centers because the manufacturer can maximize the floor space and take advantage of the relatively unused ceiling airspace above the projection console.

When the customer views the image through the projection console, the customer sees the product as if the product was in a real setting. For example, 12×12 inch floor tiles look to be approximately 12×12 inches. This provides the customer with an improved perspective of the product from which to make an informed purchase decision.

OBJECT AND SUMMARY OF THE INVENTION

An object of the present invention is to provide an economical solution for viewing images of floor, ceiling, and wall coverings in a lighted display room.

A feature of the present invention is the non-photographic use of the retroreflective screen material.

Another feature of the present invention is the ability to project the image on a screen mounted above the projection console with an optional vertical drop-down screen.

An advantage of the present invention is that customers can view full size images of floor, ceiling, and wall coverings as they would appear in a realistic setting.

One of the primary difficulties for a customer in selecting a floor, ceiling, or wall covering is that the prospective customer has always had a difficult time perceiving how the covering material will actually look in a large area. Manufacturers typically provide samples of the various available products and show photographs of the products in actual room settings. Customers still find it difficult to generalize from the photograph to a more normal size room setting.

This invention is a unique combination of elements that provides manufacturers with an economical and effective way to display their product in approximately real size perspective using photographic slides of the product in use and a special projection process. We first photograph various colors and designs of floor, ceiling, or wall coverings on color slide film in real room like settings. If a customer wants to view a particular pattern and color, we can load a stock photographic slide into a normal slide projector mounted in a custom projection console. The projection console consists of a mount for the projector, a viewing area for the customer, and a beamsplitter to reflect the projected image on to special retroreflective projection screens. By using the beamsplitter, we can position the customer so that their viewing angle is directly on the projection path to the projection screen, which is the area of maximum brilliance of the retroreflective projection screens. The customer is able to see the projected image even under normal room light conditions, because the projection screen, at the customer's viewing angle is approximately 1,500 times brighter than an ordinary white projection screen. The projected image looks bright and clear when viewed through the beamsplitter in the projection unit. As a result, a customer is able to view many different photographic samples as he or she attempts to make a choice.

The retroreflective projection screens of the present invention consist of a retroreflective screen mounted above the projection console with an optional drop-down slatted retroreflective projection screen. The screens contain a coating of a special retroreflective material. The screen mounted above the projection console reflects the projected image in a normal fashion. The drop down reflective screen reflects light because it consists of a plurality of slats with each slat covered with the same retroreflective material and angled so that the surface of each slat is approximately perpendicular to the projected light containing the image of the product. From the viewing point, the viewer sees the images displayed as they appear to be in real size perspective. That is, a projected 12×12 inch floor tile looks as though it takes up approximately 12×12 inches of projected floor area. In essence, the invention provides the consumer with a real size lifelike visual presentation of the product.

DESCRIPTION OF THE DRAWINGS

To further aid in understanding the invention, the attached drawings help illustrate specific features of the invention. The following is a brief description of the attached drawings.

DETAILED DESCRIPTION OF THE INVENTION

Consideration of the following example, which is purely exemplary, further clarifies the use of the invention.

This invention improves a customer's visual perception of various floor, ceiling, or wall coverings. A custom designed projection assembly uses light to project a color photographic transparency of a product in an actual setting. A beamsplitter enables the viewer's line of vision to be on the same optical path as the projected photographic transparency. This results in maximum brilliance of the projected image because it takes advantage of the retroreflective optical characteristics of the special projection screen material.

Figure 1:
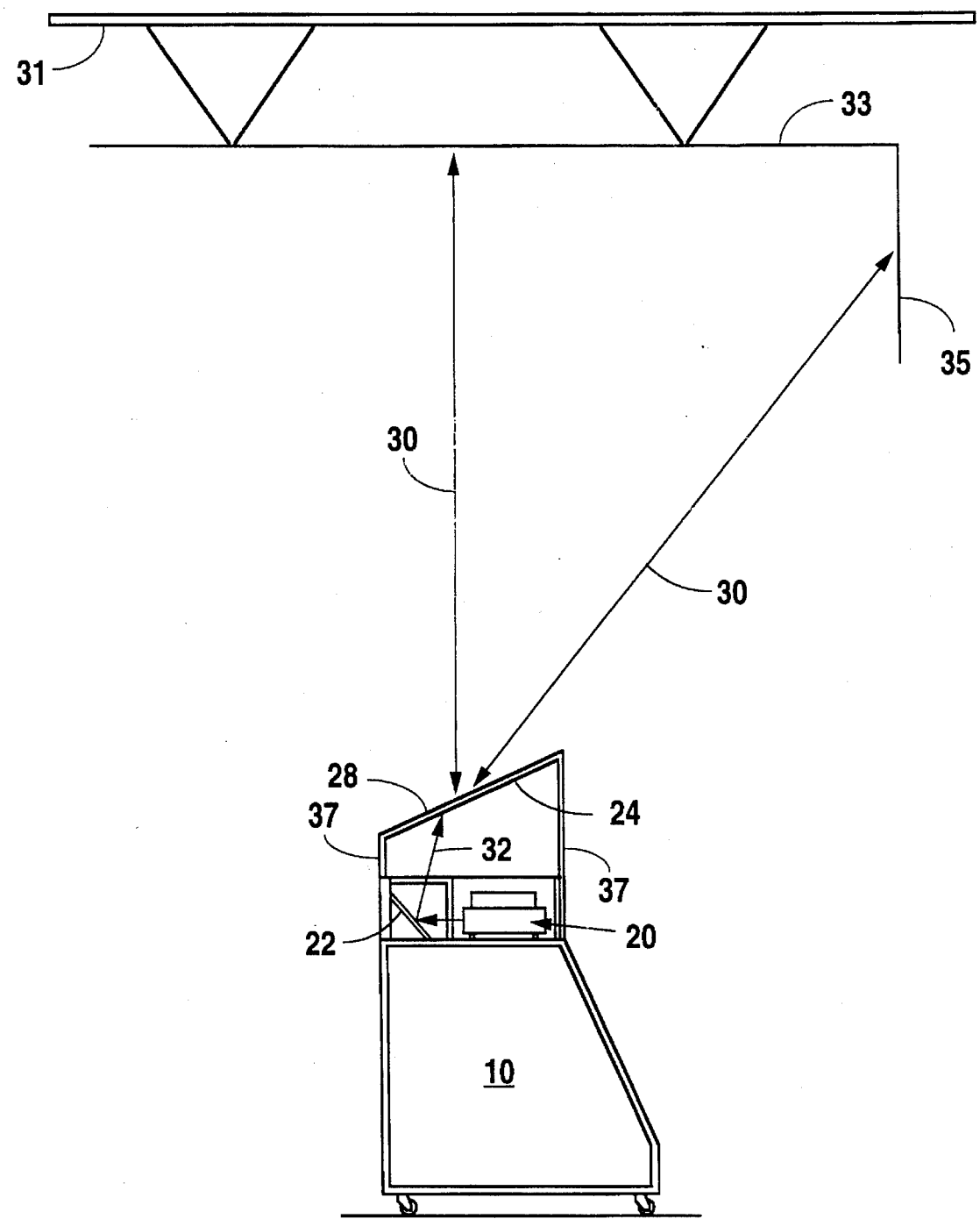
FIG. 1 is a side view of the preferred embodiment of the invention showing overhead viewing.

FIG. 1 shows the present invention as it might appear in the showroom of a floor, ceiling, or wall covering manufacturer. The projection tower 10 is below retroreflective screen 33 and the slatted retroreflective screen 35. In the preferred embodiment, we use an ordinary photographic slide projector 20 for projecting the images of the various styles, colors, shapes, and designs of floor, ceiling, and wall coverings. The images of the many different combinations of coverings are on photographic slides. The images were shot so that when displayed through the present invention the images appear full size in as a realistic setting as possible. Future embodiments of the invention encompass using a different type of projection system. Instead of using a photographic slide projector, for example, we could use a computer with the images stored in digital form.

The light 32 containing the image of the furnishing emanates from the projector 20. Mirror 22 reflects the light 32 to the beamsplitter 24. Nonreflective supports 37 attach beamsplitter 24 to projection console 10. Beamsplitter 24 has two functions. First, it passes light 32 and reflects it as light 30 and contains the image to the retroreflective screens 33 and 35. And second, beamsplitter 24 enables the customer to view the image on retroreflective screens 33 and 35 from the ideal position for maximum viewing brilliance to the customer. The ideal position for maximum viewing brilliance to the customer is when the customer is behind the projection tower 10 and looking through the beamsplitter 24 from viewing position 28. The light 30 containing the images reflects off retroreflective screen 33 and 35 traveling back along the same optical light path before striking beamsplitter 24. The resulting visual effect makes the viewer customer feel as though they are viewing the scene in a full size perspective.

Figure 2:
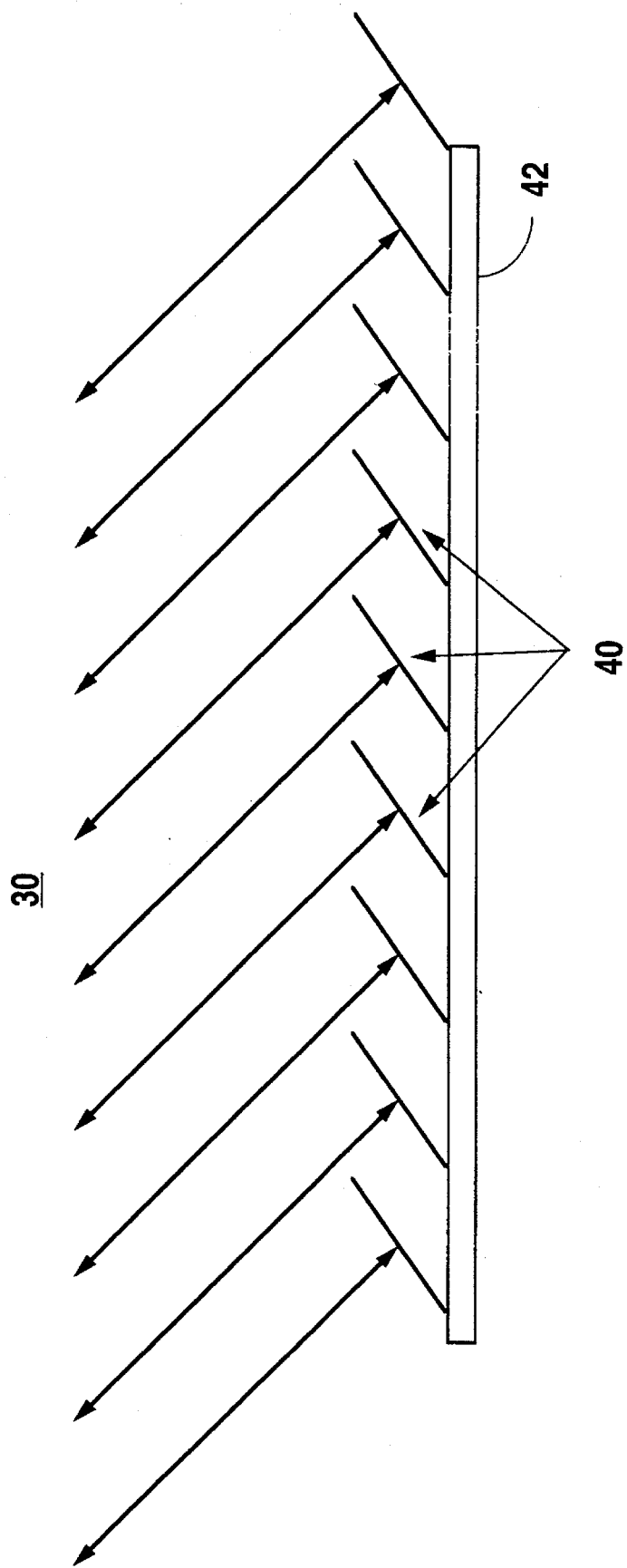
FIG. 2 is a side view of a slatted retroreflective screen.

FIG. 2 is a close-up detail of the slatted retroreflective screen 35 of FIG. 1. The screen consists of the substrate 42 and a plurality of angled slats 40. In the preferred embodiment, substrate 42 is made of aluminum, although any other rigid or semi-rigid material is suitable. Each angled slat 40 is at an angle such that the surface of each slat is approximately perpendicular to the light 30 of the projected image. The angle of the individual slats enables each slat to reflect the light with maximum intensity.

To enable the present invention to work in normal ambient light with an ordinary photographic slide projector, a special retroreflective material is necessary to coat the retroreflective screen 33 of FIG. 1 and the individual slats 40 of FIG. 2 that comprise the slatted retroreflective screen 35 of FIG. 1. Any retroreflective material that is much brighter than an ordinary white projection screen is suitable for use in the present invention. For example, we use in the preferred embodiment SCOTCHLITE, a trademark of the 3M Corporation, for the retroreflective material coating. SCOTCHLITE is approximately 1,500 times brighter than an ordinary white projection screen, and when combined with our present invention, allows a customer to view the images of the coverings in normal ambient light.

Other embodiments of the invention will be apparent to those skilled in the art after considering this specification or practicing the disclosed invention. The specification and examples above are exemplary only, with the true scope of the invention being indicated by the following claims.

We claim the following invention:

1. An apparatus for displaying floor, ceiling, and wall coverings, comprising:

an image;

a projector that projects said image using light;

a beamsplitter for directing the light to one or more retroreflective screens mounted above said beamsplitter, said retroreflective screens further comprise one or more slatted retroreflective screens;

said retroreflective screens reflect the light containing said image back to said beamsplitter; and the reflected image being viewable through said beamsplitter.

2. The apparatus of claim 1 wherein said retroreflective screens further comprise a horizontally mounted retroreflective screen.

3. The apparatus of claim 1 wherein said retroreflective screens further comprise a vertically mounted retroreflective screen.

4. The apparatus of claim 3 wherein said retroreflective screens further comprise a horizontally mounted retroreflective screen.

5. An apparatus for displaying floor, ceiling, and wall coverings, comprising:

an image;

projecting means for projecting said image using light;

beamsplitting means for directing the light to one or more retroreflective screens mounted above of said beamsplitting means, said retroreflective screens further comprise one or more slatted retroreflective screens;

said retroreflective screens reflect the light containing said image back to said beamsplitting means; and the reflected image being viewable through said beamsplitting means.

6. The apparatus of claim 5 wherein said retroreflective screens further comprise a horizontally mounted retroreflective screen.

7. The apparatus of claim 5 wherein said retroreflective screens further comprise a vertically mounted retroreflective screen.

8. The apparatus of claim 7 wherein said retroreflective screens further comprise a horizontally mounted retroreflective screen.

9. A method for displaying floor, ceiling, and wall coverings, comprising the following steps:

projecting an image using light from a display device;

dividing and directing the light to one or more retroreflective screens mounted above of said display device, said retroreflective screens further comprise one or more slatted retroreflective screens;

reflecting the light from said retroreflective screens back to the display device; and viewing said image from a position behind said display device.

10. The method of claim 9 wherein said retroreflective screens further comprise a horizontally mounted retroreflective screen.

11. The method of claim 9 wherein said retroreflective screens further comprise a vertically mounted retroreflective screen.

12. The method of claim 11 wherein said retroreflective screens further comprise a horizontally mounted retroreflective screen.

* * * * *